Oct. 18, 1960 W. VAN GOOL ET AL 2,957,152
RADIATION-SENSITIVE DEVICE AND METHOD OF MAKING
Filed March 13, 1957
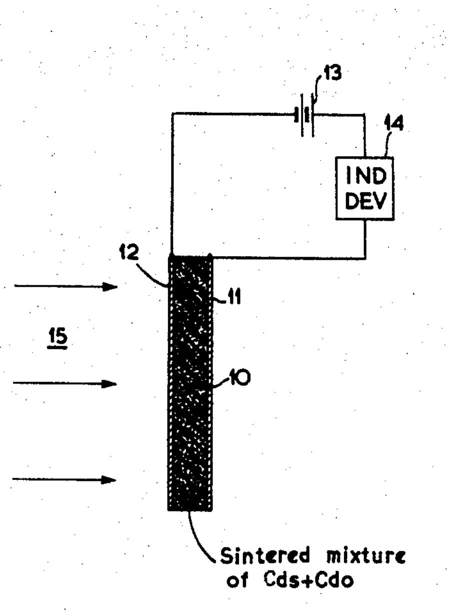
INVENTORS
WILLEM VAN GOOL
JOHANNES GERRIT VAN SANTEN
HUBERTUS JOHANNES JOZEF BRECH
BY [signature]
AGENT 2,957,152

RADIATION-SENSITIVE DEVICE AND METHOD OF MAKING

Willem Van Gool, Johannes Gerrit Van Santen, and Hubertus Johannes Jozef Brech, all of Eindhoven, Netherlands, assignors to North American Philips Company, Inc., New York, N.Y., a corporation of Delaware Filed Mar. 13, 1957, Ser. No. 645,815

Claims priority, application Netherlands Mar. 22, 1956

8 Claims. (Cl. 338—15)

This invention relates to a method of making a radiation-sensitive device, and to devices made by such method.

It is known to make a radiation-sensitive device by providing cadmium sulphide powder, molding or compressing it into a particular form, such as a layer, and then sintering the so-formed layer at a relatively high temperature. In most cases, it is desirable to introduce small amounts of activators, such as copper and gallium, into the layer, which is usually done by preheating the cadmium sulphide powder with the activators for a short time at a relatively high temperature. The body or layer so produced is provided with a pair of electrodes, and then connected in a suitable circuit usually including a source of potential and some form of indicating device. When such layers are subjected to radiation, such as visible radiation, ultra-violet radiation, X-radiation, or the like, the conductivity of the layer increases in accordance with the intensity of the incident radiation by the generation of charge carriers therein, which manifests itself by an increased flow of current in the external circuit. The indicating device may be a simple current meter having a scale graduated in radiation intensity. Radiation sensitive members are also used as the radiation-sensitive parts of a solid-state image intensifier.

The main drawback of such devices is their very long decay time, by which is meant the time interval after termination of the incident radiation during which the number of charge carriers in the layer decreases to $1/e$ times the original amount of carriers produced by the incident radiation, where $e$ equals the base of natural logarithms.

The chief object of the invention is to provide a radiation-sensitive device including a body containing cadmium sulphide and having a decay characteristic substantially shorter than that obtained with the prior art devices.

According to the invention, to the cadmium sulphide powder, which may or may not be activated, is added cadmium oxide powder. The mixture of powders is then formed into the desired shape and sintered at an elevated temperature of about 700° to 1200° C. This technique has resulted in the production of a device having a decay time which is shorter than that obtainable with prior art devices by a factor of about 10 to 20. Further, it has also been found that this reduction in decay time was also accompanied by an increase in sensitivity of the device to the radiation. A further advantage of this technique is that it enables the cadmium sulphide-containing body to be sensitized with oxygen in a relatively simple manner, which oxygen, of course, derives from the cadmium oxide, and, still further, that the distribution of the oxygen through the layer is very homogeneous, which is highly advantageous.

The following example will illustrate the invention with greater clarity. The starting material was cadmium sulphide powder, to which was added $2\times10^{-4}$ gram atoms of copper per mole of cadmium sulphide and $2\times10^{-4}$ gram atoms of gallium per mole of cadmium sulphide as activators. The mixture was preheated for two hours at a temperature of about 850° C. in an atmosphere consisting of HS. From 2 grams of this powder was compacted, at a pressure of 7,000 kilograms/square centimeter, a pellet having a diameter of approximately 3 cms. and a thickness of 0.8 mm. The pellet was then sintered for half an hour at 950° C. in a nitrogen atmosphere. This represents a pellet made without the cadmium oxide and thus according to the prior art. By a similar technique, the cadmium sulphide powder was activated and preheated. This time, however, to 2 grams of the powder was added 3% by weight of cadmium oxide powder and the powders mixed together. Again, a pellet was formed with the same pressure, of the same size, and also sintered for the time, at the temperature, and in the atmosphere noted above. To the two pellets were then applied electrodes, which may be by evaporation, and the two pellets connected in external circuits and subjected to light with an intensity of 10 lux. The decay time of the pellet made without the oxide was 10 seconds, whereas that of the pellet made in accordance with the invention was 0.5 second; i.e., they differed by a factor of 20. Further, the sensitivity of the pellet made according to the invention to the radiation was larger by a factor of 3 than that of the first-made pellet. The improvement obtained is thus obvious.

While a nitrogen atmosphere was specified for the final sintering, it will be appreciated that any neutral atmosphere will suffice. So, for example, argon is satisfactory. Further, the compacting pressure of the powders is not critical, but a high value is preferred because satisfactory coherence obtains and a denser packing of the crystal lattice also follows. The addition of the activators is not essential to the invention but is desirable because of the increased sensitivity resulting, which is well known in connection with prior art devices. The preheating of the cadmium sulphide powder with the activators is preferably effected prior to the mixing of the powders with the added cadmium oxide.

With regard to the quantity of cadmium oxide that may be employed, the best results are obtained when the powder mixture contains at most about 10% by weight of cadmium oxide, and the preferred range is 0.1 to 5% by weight of cadmium oxide.

The accompanying drawing shows, partly in cross-section and partly schematically, one form of device according to the invention. Referring now to the drawing, the device shown comprises a layer 10 formed, as described above, by sintering a compacted mixture of cadmium sulphide and cadmium oxide powders. To opposite sides of the layer are provided a pair of electrodes 11 and 12, the electrode 12 preferably being radiation or light transparent, such as tin oxide. The device is connected in an external circuit including a potential source 13 and an indicating device 14. As shown, radiation 15, indicated by arrows, is incident on the device, and the current flowing in the external circuit will depend upon the intensity of that incident radiation.

While the invention has been described in connection with specific embodiments, it will be appreciated that this is for illustrative purpose only, and other modifications, for instance, its use as a radiation sensitive part of a solid-state image intensifier, will be readily apparent to those skilled in the art without departing from the spirit and scope of the invention as defined in the appended claims.

What is claimed is:

1. A method of manufacturing a cadmium sulphide, radiation-sensitive member exhibiting reduced decay time, which comprises adding between 0.1% and 10% by weight of cadmium oxide powder to and mixing with cadmium sulphide powder, compacting said mixed powders to form a body, and sintering said compacted body in a neutral atmosphere at a temperature of between 700° and 1200° C.

2. A method as set forth in claim 1 wherein the cadmium sulphide powder is activated and preheated prior to being mixed with the cadmium oxide powder.

3. A method of manufacturing an improved cadmium sulphide, radiation-sensitive member, comprising forming a body of mixed cadmium sulphide and cadmium oxide powders containing between about 0.1% and 10% by weight of the cadmium oxide, and sintering said body at a temperature of between about 700° and 1200° C.

4. A method as set forth in claim 3 wherein the mixture contains between about 0.1% and 5% by weight of cadmium oxide.

5. A radiation-sensitive body consisting essentially of a sintered mixture of cadmium sulphide and between about 0.1% and 10% by weight of cadmium oxide powder.

6. A radiation-sensitive body consisting essentially of a compacted and sintered mixture of cadmium sulphide and cadmium oxide powders with the latter present in amounts between about 0.1% and 5% by weight of the mixture.

7. A body as set forth in claim 6 containing of the order of $10^{-4}$ gram atoms of copper and of the order of $10^{-4}$ gram atoms of gallium per mole of cadmium sulphide.

8. A radiation-sensitive device comprising a compacted and sintered mixture consisting essentially of activated cadmium sulphide and cadmium oxide powders with the latter present in amounts between 0.1% and 10% by weight of the mixture, and a pair of electrodes coupled to said compacted and sintered mixture.

References Cited in the file of this patent

UNITED STATES PATENTS

| | | |
|---|---|---|
| 2,651,700 | Gans | Sept. 8, 1953 |
| 2,654,852 | Goodrich | Oct. 6, 1953 |
| 2,742,438 | Thomsen | Apr. 17, 1956 |

FOREIGN PATENTS

| | | |
|---|---|---|
| 695,936 | Great Britain | Aug. 19, 1953 |

OTHER REFERENCES

Journal of the Optical Society of America, vol. 45, No. 9, Preparation of Photoconductive Films of Cadmium Sulfide by R. C. Nelson, pages 774 and 775.

UNITED STATES PATENT OFFICE

CERTIFICATION OF CORRECTION

Patent No. 2,957,152 October 18, 1960

Willem Van Gool et al.

It is hereby certified that error appears in the above numbered patent requiring correction and that the said Letters Patent should read as corrected below.

Column 2, line 5, for "HS" read -- $H_2S$ --.

Signed and sealed this 4th day of July 1961.

(SEAL)
Attest:

ERNEST W. SWIDER
Attesting Officer

DAVID L. LADD
Commissioner of Patents